United States Patent
Liu et al.

(10) Patent No.: US 11,363,290 B2
(45) Date of Patent: Jun. 14, 2022

(54) BLOCK SIZE RESTRICTIONS FOR DMVR

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 16/998,653

(22) Filed: Aug. 20, 2020

(65) Prior Publication Data

US 2020/0382807 A1 Dec. 3, 2020

Related U.S. Application Data

(63) Continuation of application No. PCT/IB2019/055616, filed on Jul. 2, 2019.

(Continued)

(51) Int. Cl.
*H04N 19/176* (2014.01)
*H04N 19/513* (2014.01)
(Continued)

(52) U.S. Cl.
CPC ......... *H04N 19/513* (2014.11); *H04N 19/176* (2014.11); *H04N 19/44* (2014.11); *H04N 19/56* (2014.11)

(58) Field of Classification Search
CPC .... H04N 19/513; H04N 19/184; H04N 19/44; H04N 19/543
See application file for complete search history.

(56) References Cited

U.S. PATENT DOCUMENTS 5,661,524 A 8/1997 Murdock et al.
7,627,037 B2 12/2009 Li et al.
(Continued)

FOREIGN PATENT DOCUMENTS

CN 101039419 A 9/2007
CN 102710934 A 10/2012
(Continued)

OTHER PUBLICATIONS

Chen et al. "EE3: Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting, Chengdu, CN, Oct. 2016, document JVET-E0052, 2016.

(Continued)

*Primary Examiner* — Jessica M Prince
(74) *Attorney, Agent, or Firm* — Perkins Coie LLP

(57) ABSTRACT

Methods of enabling and disabling a decoder-side motion vector refinement (DMVR) video decoder and/or encoder are described. One example method includes determining a width (W) and a height (H) of a video block, making a determination, based on a condition of the video block, between enabling and disabling a decoder side motion vector refinement step for a conversion between the video block and a coded representation of the video block, in a case that the determination is enabling, performing the conversion by enabling the decoder side motion vector refinement step; and in a case that the determination is disabling, performing the conversion by disabling the decoder side motion vector refinement step, wherein the decoder side motion vector refinement step includes refining value of a motion vector signaled in the coded representation and using the refined value during the conversion.

20 Claims, 3 Drawing Sheets

Related U.S. Application Data

(60) Provisional application No. 62/693,412, filed on Jul. 2, 2018.

(51) Int. Cl.
*H04N 19/44* (2014.01)
*H04N 19/56* (2014.01)

(56) References Cited

U.S. PATENT DOCUMENTS

| | | | |
|---|---|---|---|
| 8,228,990 | B2 | 7/2012 | Visharam et al. |
| 8,755,437 | B2 | 6/2014 | Lin et al. |
| 9,294,777 | B2 | 3/2016 | Wang |
| 9,497,481 | B2 | 11/2016 | Kitahara et al. |
| 9,521,425 | B2 | 12/2016 | Chen et al. |
| 9,667,996 | B2 | 5/2017 | Chen et al. |
| 9,762,927 | B2 | 9/2017 | Chen et al. |
| 10,523,964 | B2 | 12/2019 | Chuang et al. |
| 10,764,592 | B2 | 9/2020 | Zhang et al. |
| 10,779,002 | B2 | 9/2020 | Chen et al. |
| 10,785,494 | B2 | 9/2020 | Chien et al. |
| 11,159,816 | B2 | 10/2021 | Liu et al. |
| 2002/0025001 | A1 | 2/2002 | Ismaeil et al. |
| 2003/0138150 | A1 | 7/2003 | Srinivasan |
| 2004/0156435 | A1 | 8/2004 | Itoh et al. |
| 2005/0013364 | A1 | 1/2005 | Hsu et al. |
| 2007/0286286 | A1 | 12/2007 | Heng et al. |
| 2008/0043831 | A1 | 2/2008 | Sethuraman et al. |
| 2008/0212676 | A1 | 9/2008 | Liu et al. |
| 2009/0161761 | A1 | 6/2009 | Ramachandran et al. |
| 2009/0232215 | A1 | 9/2009 | Park et al. |
| 2010/0309979 | A1 | 12/2010 | Schoenblum |
| 2011/0103482 | A1 | 5/2011 | Lee |
| 2011/0176611 | A1* | 7/2011 | Huang .............. H04N 19/46 375/240.16 |
| 2012/0044998 | A1 | 2/2012 | Kokaram et al. |
| 2012/0128071 | A1 | 5/2012 | Celetto et al. |
| 2012/0140830 | A1 | 6/2012 | Xu et al. |
| 2012/0155540 | A1 | 6/2012 | Jagannathan |
| 2014/0146890 | A1 | 5/2014 | Chiu et al. |
| 2014/0286408 | A1 | 9/2014 | Zhang et al. |
| 2015/0181216 | A1 | 6/2015 | Zhang et al. |
| 2015/0195562 | A1 | 7/2015 | Li et al. |
| 2015/0264387 | A1 | 9/2015 | Rapaka et al. |
| 2016/0345011 | A1 | 11/2016 | Naing et al. |
| 2017/0332107 | A1 | 11/2017 | Abbas et al. |
| 2017/0347093 | A1 | 11/2017 | Yu et al. |
| 2017/0347102 | A1 | 11/2017 | Panusopone et al. |
| 2018/0098079 | A1 | 4/2018 | Chuang et al. |
| 2018/0184117 | A1 | 6/2018 | Chen et al. |
| 2018/0199057 | A1 | 7/2018 | Chuang et al. |
| 2018/0241998 | A1 | 8/2018 | Chen et al. |
| 2018/0359483 | A1 | 12/2018 | Chen et al. |
| 2019/0110058 | A1 | 4/2019 | Chien et al. |
| 2019/0132606 | A1* | 5/2019 | Su .............. H04N 19/176 |
| 2019/0306502 | A1 | 10/2019 | Gadde et al. |
| 2019/0342557 | A1 | 11/2019 | Robert et al. |
| 2020/0128258 | A1* | 4/2020 | Chen .............. H04N 19/533 |
| 2020/0296414 | A1 | 9/2020 | Park et al. |
| 2020/0374543 | A1 | 11/2020 | Liu et al. |
| 2020/0374544 | A1 | 11/2020 | Liu et al. |
| 2020/0382795 | A1 | 12/2020 | Zhang et al. |
| 2020/0396453 | A1 | 12/2020 | Zhang et al. |
| 2021/0029362 | A1 | 1/2021 | Liu et al. |
| 2021/0051339 | A1 | 2/2021 | Liu et al. |
| 2021/0076063 | A1 | 3/2021 | Liu et al. |
| 2021/0084322 | A1* | 3/2021 | Chen .............. H04N 19/70 |
| 2021/0092435 | A1 | 3/2021 | Liu et al. |

FOREIGN PATENT DOCUMENTS

| | | |
|---|---|---|
| CN | 102970543 A | 3/2013 |
| CN | 104780383 A | 7/2015 |
| CN | 105120265 A | 12/2015 |
| CN | 106105196 A | 11/2016 |
| CN | 106165423 A | 11/2016 |
| CN | 107483960 A | 12/2017 |
| CN | 108028937 A | 5/2018 |
| EP | 3701718 A1 | 9/2020 |
| TW | 201813396 A | 4/2018 |
| WO | 2015142833 A1 | 9/2015 |
| WO | 2017197146 A1 | 11/2017 |
| WO | 2018002021 A1 | 1/2018 |
| WO | 2018121506 A1 | 7/2018 |
| WO | 2019001786 A1 | 1/2019 |
| WO | 2019231706 A1 | 12/2019 |

OTHER PUBLICATIONS

Chen et al. "Algorithm Description of Joint Exploration Test Model 5," Joint Video Exploration Team (JVET) of ITU-T SG 16 WP 3 and ISO/IEC JTC 1/SC 29/WG 11, 5th Meeting, Geneva, CH, Jan. 12-20, 2017, document JVET-E1001, 2017.

Chen et al. "Algorithm Description of Joint Exploration Test Model 7 (JEM7))," Joint Video Exploration Team (JVET) of ITU-T SG 16 WP 3 and ISO/IEC JTC 1/SC 29/WG 11, 7th Meeting, Torino, IT, Jul. 13-21, 2017, document JVET-G1001, 2017.

Chen et al. "Description of SDR, HDR and 360 degrees Video Coding Technology Personal by Huawei, GoPro, HiSilicon and Samsung," buJoint Video Exploration Team (JVET) of ITU-T SG WP 3 and ISO/IEC JTC 1/SC 29/WG 11, 10th Meeting: San Diego, Apr. 10-20, 2018, Document JVET-J0025, 2018.

Chen et al. "CE9.2.5/9.2.6: DMVR with Template-Free Bilateral Matching," Joint Video Experts Team (JVET) of ITU-T SG 16 WP 3 and ISO/IEC JTC 1/SC 29/WG 11, 11th Meeting, Ljubljana, SI, Jul. 2018, document JVET-K0359, 2018.

Chien, Wei-Jung, "Core Experiment 12: Adaptive Motion Vector Resolution," Joint Collaborative Team on Video Coding (JCT-VC) of ITU-T SG 16 WP3 and ISO/IEC JTC 1/SC29 WG 11, 3rd Meeting, Guangzhou, CN, Oct. 7-15, 2010, document JCTVC-C512 M18605, 2010.

Esenlik et al. "CE9: Report on the Results of Tests CE9.2.15 and CE9.2.16," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0163, 2018.

Hsu et al. "Description of SDR Video Coding Technology Proposal by MediaTek" Joint Video Experts Team (JVET) of ITU-T SG 16 WP 3 and ISO/IEC JTC 1/SC 29/WG 11, 10th Meeting, San Diego, Apr. 10-20, 2018, document JVET-J0018, 2018.

Kamp et al. "Decoder Side Motion Vector Derivation for Inter Frame Video Coding," 15th IEEE International Conference on Image Processing, San Diego, Oct. 12-15, 2008, pp. 1120-1123.

Kang et al. "Description of SDR Video Coding Technology Proposal by ETRI and Sejong University," Joint Video Experts Team (JVET) of ITU-T SG 16 WP 3 and ISO/IEC JTC 1/SC 29/WG 11, 10th Meeting, San Diego, Apr. 10-20, 2018, document JVET-J0013, 2018.

Liao et al. "Non-CE9: Simplification of DMVR and BDOF Combination," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0484, 2019.

Liu et al. "CE-9 related: Simplification of Decoder Side Motion Vector Derivation," Joint Video Experts Team (JVET) of ITU-T SG 16 WP3 and ISO/IEC JTC 1/SC 29/WG 11, 11th Meeting, Ljubljana, SI, Jul. 2018, document JVET-K0105-v1.

Park et al. "CE9-Related: Restricted Template Matching Schemes to Mitigate Pipeline Delay," Joint Video Exploration Team (JVET) of ITU-T SG 16 WP 3 and ISO/IEC JTC 1/SC 29/WG 11, 11th Meeting, Ljubljana, SL, Jul. 10-20, 2018, document JVET-K0093, 2018.

Rapaka et al. "AhG8: On Fast Intersearch Method for Screen Content Coding," Joint Collaborative Team on Video Coding (JCT-VC) of ITU-T SG 16 WP3 and ISO/IEC JTC 1/SC 29/WG11, 17th meeting: Valencia, ES, Mar. 27, 2014 to Apr. 4, 2014, document JCTVC-Q0147, 2014.

(56) References Cited

OTHER PUBLICATIONS

Schuster et al. "An Optimal Quad-Tree-Based Motion Estimator," Visual Communications and Image Processing, Jan. 20, 2004, San Jose, Oct. 7, 1996, 2952:50-61, XP001130814.

Venugopal et al. "Intra Region-based Template Matching," Joint Video Exploration Team (JVET) of ITU-T SG 16 WP 3 and ISOr/IEC JTC 1/SC 29/WG 11, 10th Meeting, San Diego, Apr. 10-20, 2018, document JVET-J0039, 2018.

Wien et al. "TE1: TWTH Partner Report on DMVD," Joint Collaborative Team on Video Coding (JCT-VC) of ITU-T SG 16 WP3 and ISO/IEC JTC1/SC29/WG11, 2nd Meeting, Geneva, CH, Jul. 21-28, 2010, document JCTVC-B030, 2010.

Xiu et al. "Description of SSR, HDR, and 360 Degrees Video Coding Technology Proposal by InterDigital Communications and Dolby Laboratories," Joint Video Experts Team (JVET) of ITU-T SG 16 WP 3 and ISO/IEC JTC 1/SC 29/WG 11, 10th Meeting: San Diego, Apr. 10-20, 2018, document JVET-J0015, 2018.

Xu et al. "On Latency Reduction for Template-based Inter Prediction," Joint Video Experts Team (JVET) if ITU-T SG 16 WP 3 and ISO/IEC JTC 1/SC 29/WG 11, 10th meeting, San Diego, Apr. 10-20, 2018, document JVET-J0045, 2018.

Yang et al. "Efficient Motion Vector Coding Algorithms Based on Adaptive Template Matching Techniques," Video Coding Exports Group (VCEG) 39th Meeting Kyoto Japan, Jan. 17-22, 2010, document VCEG-AM16, 2010.

Zhu et al. "Non-CE8: Adaptive Fractional MVD Search in DMVR for SCC," Joint Video Experts Team (JVET) of ITU SG 16 WP 3 and ISO/IEC JTC 1/SC 29/WG 11, 14th Meeting, Geneva, CH, Mar. 19-27, 2019, document JVET-N0260, 2019.

"Report of the 117th Meeting," Motion Picture Expert Group or ISO/IEC JTC1/SC29/WG11, 117, MPEG Meeting; Jan. 16-20, 2017, Geneva, document N16569, 2017.

International Search Report and Written Opinion from PCT/IB2019/054706 dated Sep. 27, 2019, (17 pages).

International Search Report and Written Opinion from PCT/IB2019/054707 dated Sep. 26, 2019, (17 pages).

International Search Report and Written Opinion from PCT/IB2019/054709 dated Nov. 18, 2019, (18 pages).

International Search Report and Written Opinion from PCT/IB2019/054710 dated Nov. 18, 2019, (18 pages).

International Search Report and Written Opinion from PCT/IB2019/054711 dated Oct. 8, 2019, (17 pages).

International Search Report and Written Opinion from PCT/IB2019/054713 dated Sep. 26, 2019, (18 pages).

International Search Report and Written Opinion from PCT/IB2019/054715 dated Sep. 20, 2019, (18 pages).

International Search Report and Written Opinion from PCT/IB2019/55616 dated Oct. 9, 2019, (16 pages).

Non-Final Office Action from U.S. Appl. No. 16/993,677 dated Sep. 30, 2020.

Non-Final Office Action from U.S. Appl. No. 16/993,638 dated Oct. 8, 2020.

Final Office Action from U.S. Appl. No. 16/993,677 dated Jan. 7, 2021.

Final Office Action from U.S. Appl. No. 16/993,638 dated Feb. 24, 2021.

Non-Final Office Action from U.S. Appl. No. 16/993,677 dated May 14, 2021.

Chen et al. "Decoder-Side Motion Vector Refinement Based on Bilateral Template Matching," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0029, 2016. (cited in JP 2020-568386 OA1 dated Jan. 25, 2022).

Xu et al. "CE9-Related: Memory Bandwidth Reduction for DMVR," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0288, 2018. (cited in JP 2020-568386 OA1 dated Jan. 25, 2022).

\* cited by examiner

BLOCK SIZE RESTRICTIONS FOR DMVR

CROSS-REFERENCE TO RELATED APPLICATIONS

This application is a continuation of International Application No. PCT/IB2019/055616, filed on Jul. 2, 2019, which claims the priority to and benefits of U.S. Provisional Patent Application No. 62/693,412, filed on Jul. 2, 2018. All the aforementioned patent applications are hereby incorporated by reference in their entireties.

TECHNICAL FIELD

This document is related to video coding technologies.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow

SUMMARY

Techniques related to decoder side motion vector derivation (DMVD) in video coding are disclosed. It may be applied to the existing video coding standard like HEVC, or the standard (Versatile Video Coding) to be finalized. It may be also applicable to future video coding standards or video codec.

In one example aspect, a method of video processing is disclosed. The method includes determining a video block size width (W) and height (H), based on a condition of the video block, making a determination between enabling and disabling a decoder side motion vector refinement step for a conversion between a video block and a coded representation of the video block, in a case that the determination is enabling, performing the conversion by enabling the decoder side motion vector refinement step; and in a case that the determination is disabling, performing the conversion by disabling the decoder side motion vector refinement step, wherein the decoder side motion vector refinement step includes refining value of a motion vector signaled in the coded representation and using the refined value during the conversion.

In another example aspect, a video decoding apparatus comprising a processor configured to implement the above-described method is disclosed.

In yet another example aspect, a video encoding apparatus comprising a processor configured to implement the above-described method is disclosed.

In yet another example aspect, a computer readable medium is disclosed. The medium stores code which, upon execution by a processor, causes the processor to implement the above described method.

These, and other, aspects are further described in the present document.

DETAILED DESCRIPTION

Figure 1:
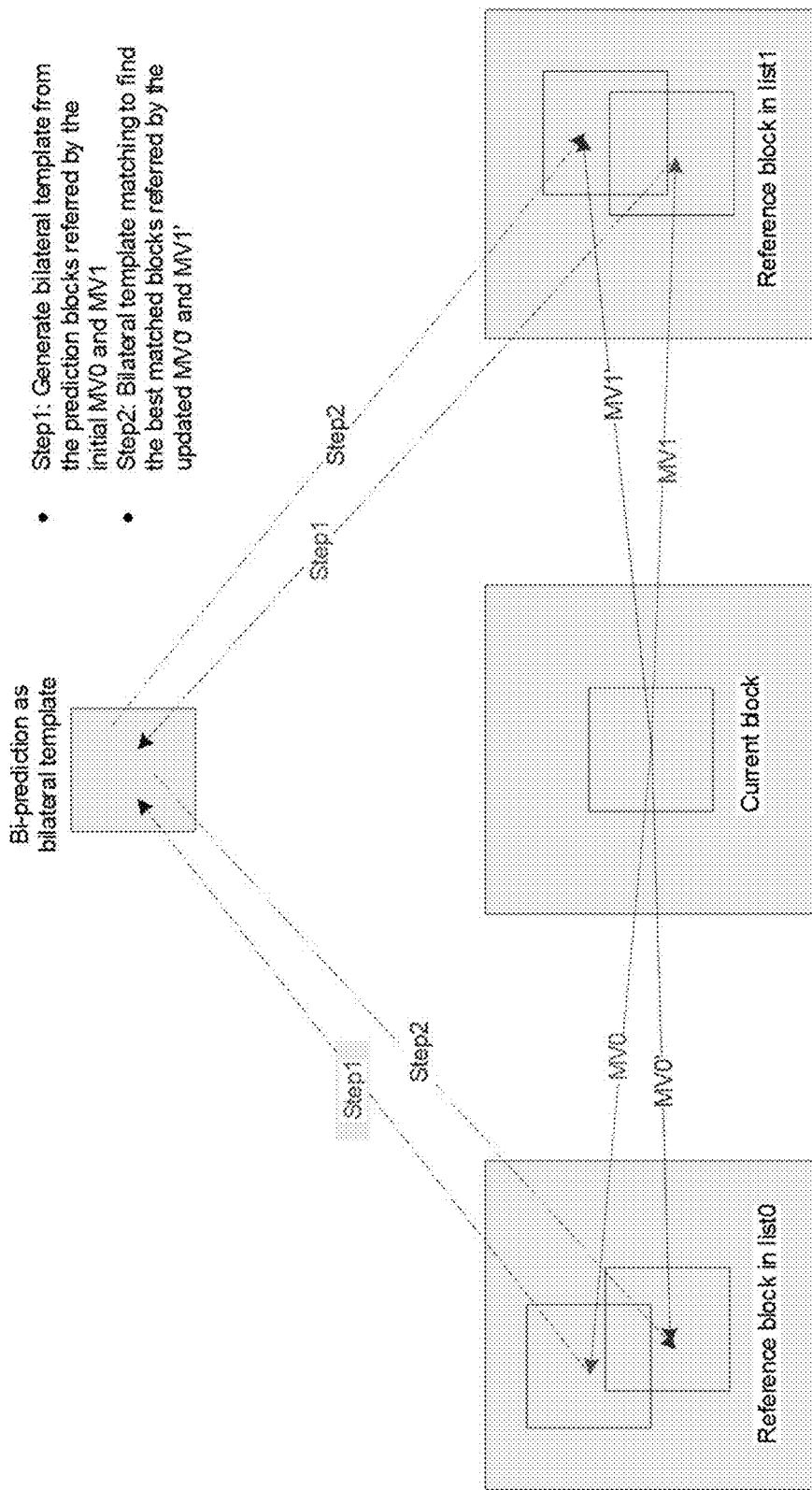
FIG. 1 shows an example of decoder-side motion vector refinement (DMVR) based on bilateral template matching.

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

Technical Framework

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

Inter Prediction in HEVC/H.265

Each inter-predicted prediction unit (PU) has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a coding unit (CU) is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signaled explicitly per each PU. Such a mode is named advanced motion vector prediction (AMVP) in this document.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction.' Bi-prediction is available for B-slices only.

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min (cost0, cost1)
   bi-prediction is used;
Otherwise, if cost0<=cost1
   uni-prediction from list0 is used;
Otherwise,
   uni-prediction from list1 is used;

where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

In DMVR, a bilateral template is generated as the weighted combination (i.e. average) of the two prediction blocks, from the initial MV0 of list0 and MV1 of list1, respectively, as shown in FIG. 1. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 1, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

In some example embodiments, as shown in FIG. 1, in a first step: Generate bilateral template from the prediction blocks referred by the initial MV0 and MV1; and in a second step: Bilateral template matching to find the best matched blocks referred by the updated MV0' and MV1'.

The disclosed techniques and devices reduce the complexity and improve the coding performance of DMVD methods.

In one aspect, the cost (e.g., difference, distortion or the cost considering both distortion and MV) between a template and a candidate block is calculated only for partial pixels in the decoder side motion estimation, i.e., in motion information derivation or refinement procedure.

In another aspect, for DMVR, the interpolation time is reduced. In another aspect, some embodiments that use the disclosed techniques apply DMVR to AMVP mode. In another aspect, weighting factor of MV difference can be different for different block sizes.

The following listing of examples provides some ways by which the disclosed techniques can be embodied into a video encoding or decoding process. Denote prec as the motion vector precision, when prec is equal to N, it means the motion vector is with $½^N$ pel precision. N can be positive integers, zero, or negative integers.

The DMVR method may be enabled/disabled according to certain conditions.

In one aspect the enabling or disabling of DMVR may depend on a block size and/or a block shape. A block size may be denoted by W×H, where W is the width of the block and H is the height. The following rules may apply:
  a. In an example, DMVR may be always disabled for block size equal to 4×4.
  b. In another example, DMVR may be always disabled for block size equal to W×4 or 4×H. H is an integer value greater than or equal to 1.
  c. In another example, DMVR may be always disabled for a block W×H, where W<=T1 or H<=T2. W, H, T1 and T2 are integer values greater than or equal to 1.
  d. In another example, DMVR may be always disabled for a block W×H, where W<=T1 and H<=T2. W, H, T1 and T2 are integer values greater than or equal to 1.
  e. In another example, DMVR may be always disabled for a block W×H, where W*H<=T0. W, H, and T0 are integer values greater than or equal to 1.
  f. In another example, DMVR may be always disabled if W/H is smaller a threshold, and/or W/H is larger than a threshold. The threshold(s) may be signaled or pre-defined (e.g., equal to 1). W and H are integer values and the threshold can be expressed as a fraction.

Denote prec as the motion vector precision, when prec is equal to N, it means the motion vector is with $½^N$ pel precision. N can be positive integers, zero, or negative integers.

The cost (e.g., difference) between the template and candidate blocks is calculated only for partially selected rows in motion information derivation or refinement procedure.
  a. In one example, selected rows are defined as all of the $i^{th}$ rows of every N rows, where N>1 and 1<=i<=N. For example, N is equal to 2 and i is equal to 1.
  b. In one example, for each group with N rows, certain rows within the group are used as the selected rows. For example, the first row and the second row of every 4 rows are utilized.
  c. In one example, cost is calculated for arbitrarily selected rows of the block, e.g., the first row and the last row, or the first two rows and last two rows.
  d. Same rule can be applied to all block sizes when selecting partial rows. Alternatively, different rules can be applied to different block sizes and/or block shapes (e.g., square or rectangular or ratios between block width and block height).
    i. In one example, during the cost calculation, more rows are skipped for larger block size and vice versa. E.g., difference is calculated for the first row of every 2 rows when the block size is smaller than 16×16 (i.e., width*height<16*16), but is calculated for the first row of every 4 rows for other block sizes.
  ii. In one example, during the cost calculation, more rows are skipped for block shapes with larger height and vice versa. E.g., cost is calculated for the first row of every 2 rows when height of the block is smaller than 16, but is calculated for the first row of every 4 rows for other block sizes.
  iii. In one example, such simplification is only applied to one or several smallest block sizes (i.e., smallest width*height) to suppress the worst-case complexity. For example, the simplification is only applied to blocks with areas smaller than 8×8.
  iv. In one example, such simplification is only applied to one or several largest block sizes. For example, the simplification is only applied to blocks with areas larger than 32×32.
  v. In one example, such simplification is only applied to one or several block shapes with largest block heights or width.
  vi. In one example, such simplification is only applied some selected block shapes.

For each row of a block or each selected row of a block, cost is calculated for all columns or only partial columns.
  a. In one example, the cost is calculated for M continuous columns (can started at any valid column Y) of every T columns, where T>0, 1<=M<=T, 1<=Y<=T−M+1. For example, T=8, M=4 and Y=1.
  b. In one example, the cost is calculated for M selected columns of every T columns.
  c. In one example, the cost is calculated for M arbitrarily selected columns of the row (e.g., the first K columns and the last L columns).
  d. Same rule can be applied to all block sizes when selecting partial columns. Alternatively, different rules can be applied to different block sizes and/or block shapes (e.g., square or rectangular or ratios between block width and block height).
     i. In one example, during the cost calculation, more columns are skipped for larger block size and vice versa. E.g., difference is calculated for the first 4 columns of every 8 columns when the block size is smaller than 16×16, but is calculated for the first 4 columns of every 16 columns for other block sizes. When the column is smaller than 8 or 16, only the first 4 columns are used to calculated difference.
     ii. In one example, during the cost calculation, more columns are skipped for block shape with larger width and vice versa. E.g., cost is calculated for the first 4 columns of every 8 columns when width of the block is smaller than 16, but is calculated for the first 4 columns of every 16 columns for other block sizes.
     iii. In one example, such simplification is only applied to one or several smallest block sizes to suppress the worst-case complexity.
     iv. In one example, such simplification is only applied to one or several largest block sizes.
     v. In one example, such simplification is only applied to one or several block shapes with largest block widths.
     vi. In one example, such simplification is only applied some selected block shapes.

In DMVR, when generating the template, motion compensation is performed using integer MV or MV with integer horizontal component or vertical component instead of using the real MV as in JEM.
  a. In one example, MV (both horizontal component and vertical component) is rounded to integer precision for both prediction directions.
  b. In one example, MV of one prediction direction is rounded to integer precision, and MV of the other prediction direction is not changed.
  c. In one example, only one MV component (either horizontal component or vertical component) is rounded to integer precision for each prediction direction.
  d. In one example, MV of one prediction direction is rounded to integer precision, and only one MV component of the other prediction direction is rounded to integer precision.
  e. In one example, MV of one prediction direction is not changed, and only one MV component of the other prediction direction is rounded to integer precision.
  f. Denote fmv as the fractional mv, and denote imv as the rounded integer precision mv. Denote sign(x) as the sign of x, and $$\text{sign}(x) = \begin{cases} 1 & \text{if } x \geq 0 \\ -1 & \text{if } x < 0 \end{cases}.$$

i. imv=(fmv+(1<<(prec−1)))>>prec
     ii. Alternatively, imv=fmv>>prec
     iii. Alternatively, imv=(fmv+sign(fmv) (1<<(prec−1))) >>prec
  g. Such simplification may be applied to all block sizes or only one or several block sizes and/or certain block shapes.
     i. In one example, it is applied to one or several smallest block sizes, like 4×4 in JEM or BMS (benchmark set), or 4×8 and 8×4 in HEVC.
     ii. In one example, it is applied to the one or several largest block sizes.
     iii. In one example, it is applied to some selected block sizes.

Alternatively, in DMVR, when generating the template, shorter tap of interpolation filter (such as bi-linear filter) is used in the motion compensation.

It is proposed that DMVR is performed in sub-block level. A block can be split into sub-blocks in different ways.
  a. In one example, all blocks are split into fixed M×N sub-block size, e.g., 4×4, or 4×8 or 8×4 or 8×8 or 8×16 or 16×8 or 16×16 etc. When the block width/height is integral multiple of the sub-block width/height, it is split into sub-blocks; otherwise, it is not split into sub-blocks.
  b. In one example, a block is split into K sub-blocks with equal size, wherein K>=2. For example, a M×N block is split into 4 (M/2)×(N/2) sub-blocks, or 2 (M/2)×N sub-blocks, or 2 M×(N/2) blocks.
  c. In one example, the split method depends on block sizes or block shapes or other coded information. For example, an 8×32 block is split into 4×8 sub-blocks and a 32×8 block is split into 8×4 sub-blocks.
  d. In one example, when generating a template of a sub-block, the derived motion information of the whole block may be utilized as in current block-level DMVR.
     i. Alternatively, the refined motion information of neighboring sub-block(s) with or without the derived motion information of the whole block may be utilized to form the template.

e. In one example, the searching point of a sub-block may also consider the refined motion information from other sub-block(s).

DMVR can be used to refine the MV precision.
a. In AMVP mode with or without AMVR, if a low precision MV is selected, DMVR can be used to refine the MV precision. The signaled MV can be used as the starting point of the decoder-side searching.
b. In merge mode, if low precision MV is inherited by the current block, DMVR can also be used to refine the MV precision. The inherited MV is set as the starting point.
c. The MV is refined progressively from precision prec or prec+1 to its higher precision (i.e., prec+K wherein K is a positive integer value) or to the highest precision allowed by the slice/picture/sequence.
   i. For MV precision p, the nearest Np points (with precision p) around the starting point are checked and the best one is selected as the starting point for the next MV precision. The best one selected in the highest MV precision is adopted as the final MV.
   ii. Alternatively, such progressive MV precision refinement process can be applied only on several MV precisions. For example, if the MV precision of the current block is 4 pel, then, only integer MV precision and ¼ MV precision are checked.
   iii. Alternatively, such progressive MV precision refinement process can terminate after a given MV precision is checked.
   iv. Alternatively, such progressive MV precision refinement process can terminate if the starting point is not changed, i.e., the MV precision is not truly refined, after a refinement loop finishes.
d. In one example, several fixed points around the starting point are checked and the best one is selected as the final MV.
   i. These fixed points can depend on the MV precision so that all or several higher MV precisions (higher than prec or prec−1) are included.
   ii. Alternatively, these fixed points are independent of the MV precision. Only points with fixed distance from the starting point are selected.

When one or more low precision MVs (or MV components) are adopted by a CU/PU, DMVR refinement in bullet [0035] may be either applied implicitly or controlled explicitly by CU/PU level DMVR flag.
a. In one example, the DMVR flag is only signaled for CU/PU adopting AMVR mode, i.e., adopting low precision MV. In this case, DMVR flag is signaled after the AMVR index.
   i. In one example, only one DMVR flag is signaled. In bi-prediction case, such DMVR flag is applied to both prediction directions.
   ii. In one example, if AMVR is controlled separately for each prediction direction, one DMVR flag is signaled and is applied to prediction direction (or prediction directions) adopting low precision MVD.
      1. Alternatively, separate DMVR flag is signaled for each prediction direction that adopts low precision MV.
b. In one example, in non-AMVR case, the DMVR flag is signaled for PU that is coded in AMVP mode and has low precision MV, or CU that contains such PU. In this case, DMVR flag is signaled after the motion information of the PU, or motion information of all PUs in the CU.
c. In one example, in non-AMVR case, the DMVR flag is signaled for PU that has low precision MV, or CU that contains such PU, regardless the PU/CU is coded in AMVP mode or merge mode. In this case, DMVR flag is signaled after the motion information of the PU, or motion information of all PUs in the CU.
d. The DMVR flag can be signaled conditionally on the lowest MV precision in the PU/CU. For example, if the lowest MV precision is higher than a given value, DMVR is always disabled and no DMVR flag is signaled.
   i. Alternatively, if the lowest MV precision is lower than a given value, DMVR is always enabled and no DMVR flag is signaled.
e. The DMVR flag may be singled conditionally on the block size/block shape/code mode, etc.

In one example, the template used by template matching (in PMMVD) only includes pixels above the current block, excluding the pixels left to the current block In FRUC, the weighting factor w of MV difference is designed depending on block size, i.e., width*height.
a. In one example, w=a*width*height, where a is fixed positive value.
b. In one example, w=a*f(width*height), where a is fixed positive value, and f(.) is sigmoid like function, or f(.) is a power function.
c. In one example, w may depend on the coded information, such as reference picture index, prediction direction (reference picture list index), POC distance between the reference picture and current picture, picture-level/slice-level quantization parameters of the reference picture and/or current picture, temporal layer index.

In existing DMVD methods, only luma component is considered to derive or refine the motion vectors. It is proposed to further consider the chroma components. Denote the costs of three color components of a given motion vector by $C_i$ (wherein i indicates the color component index).
a. The final cost is defined as $W_i * C_i$ wherein $W_i$ indicates the weights for the i-th color component.
b. Alternatively, the final cost is defined as (W0*C0+W1*(C1+C2)). In some examples, either W0 or W1 is equal to 1.
c. In one example, when applying DMVR to the chroma components, rounding of motion vectors may be applied so that integer motion vectors may be utilized and there is no need to apply interpolation for chroma components.
d. In one example, when applying DMVR to the chroma components, if interpolation is required, shorter tap of interpolation filter (such as bi-linear filter) may be applied.

The above methods may be applied to certain color component, or all color components.
a. Different rules may be applied to different color components, or luma and chroma components may utilize different rules.
b. Alternatively, how and whether to apply the above methods may be further signaled in sequence parameter set, picture parameter set, slice header, etc.

Figure 2:
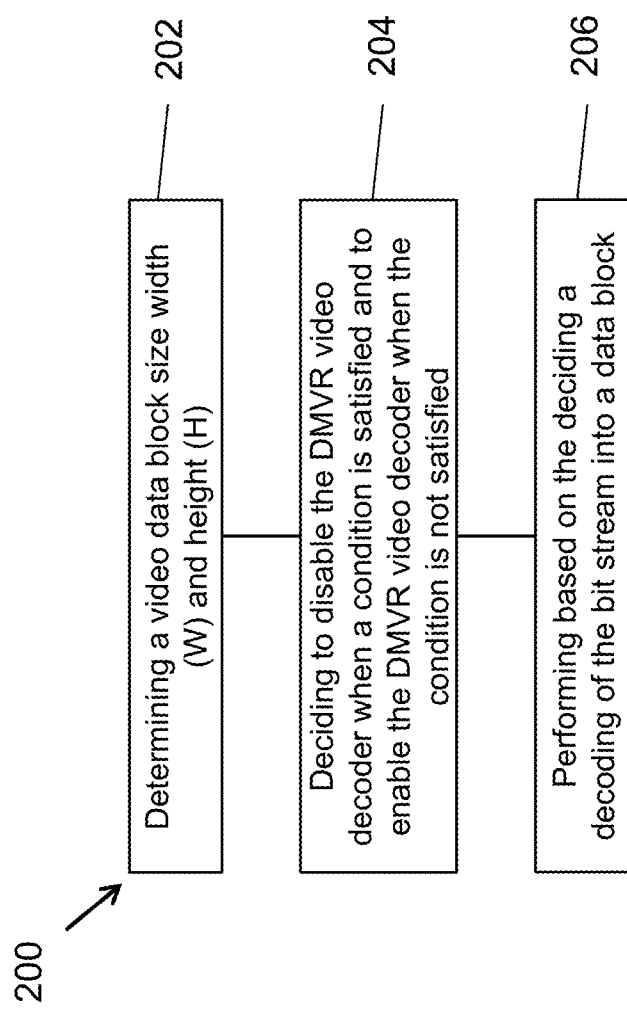
FIG. 2 is a flowchart for an example method, in accordance with some example embodiments.

FIG. 2 is a flowchart for an example method 200 of video processing. The method 200 may be used, for example, for disabling or enabling a decoder-side motion vector refinement (DMVR) video decoder or encoder. The method 200 includes determining (202) a video block size width (W) and a height (H), deciding to disable the DMVR video decoder when a condition is satisfied and to enable the DMVR video decoder when the condition is not satisfied; and performing based on the deciding a decoding of the bit stream into a data block. For example, the method 200 may include making a determination, at 204, between enabling and disabling a DMVR step during a conversion between the video block and a coded representation of the video block. After the determination, at 206, a conversion between the video block and the coded representation is performed. The conversion is performed using one mode between a first mode in which the determination is to enable DMVR, in which case the conversion is performed by enabling DMVT and a second mode in which the determination is to disable the DMVR, in which case the conversion is performed by disabling DMVR. The conversion, for example, refers to encoding or transcoding operation in which the coded representation, e.g., a bitstream, is generated. Alternatively, the conversion may result in the generation of sample values of the video block from the coded representation. Various possible embodiments and variations of the above-described method in which condition is satisfied due to one of the following rules:

The condition is satisfied due to the block size having W=4 and H=4.

The condition is satisfied due to the block size having H=4 or W=4.

The condition is satisfied due to the block size having W<=T1 or H<=T2.

The condition is satisfied due to the block size having W<=T1 and H<=T2.

The condition is satisfied due to the block size having W*H<=T0.

The condition is satisfied due to the block size having W/H is smaller than a first threshold value and W/H is larger than a second threshold.

The condition is satisfied due to the block size having W/H is smaller than a threshold value or W/H is larger than another threshold.

In the above, the thresholds T0, T1 and T2 may be fixed values that are independent of the conversion process. For example, T1 and T2 may be 4 or 8 and may be pre-specified and known to the encoder and decoder.

In the above description, the various thresholds used may represent aspect ratio of the current block. For example, the threshold may be set to 1 such that wide blocks (W>H) may use DMVR while tall blocks (W<=H) may disable the use of DMVR. Because motion often tends to be perceived more accurately in the horizontal direction, such an arrangement may help with visual quality of the coded representation be at a higher level than otherwise.

The first threshold and the second threshold are received via a message. This message may be included in a syntax element in the coded representation. The syntax element may be inserted on a slice by slice or a picture by picture basis to allow for changing thresholds at the picture or slice or coding unit levels.

In some embodiments, the decoding condition includes selection of a low precision motion vector, and wherein the generating the set of candidate blocks includes generating the set of candidate blocks using the low precision motion vector. In some embodiments, when the decoding condition is that the current block is in merge mode, the motion vector is inherited by the current block. In various modes, the precision may be improved by refining using a step size or a scale factor. For example, the step size may be 1. As another example, the scale factor may be 2, and the precision may be improved from 4 pixels to 2 pixel resolution to 1 pixel resolution, and so on.

Figure 3:
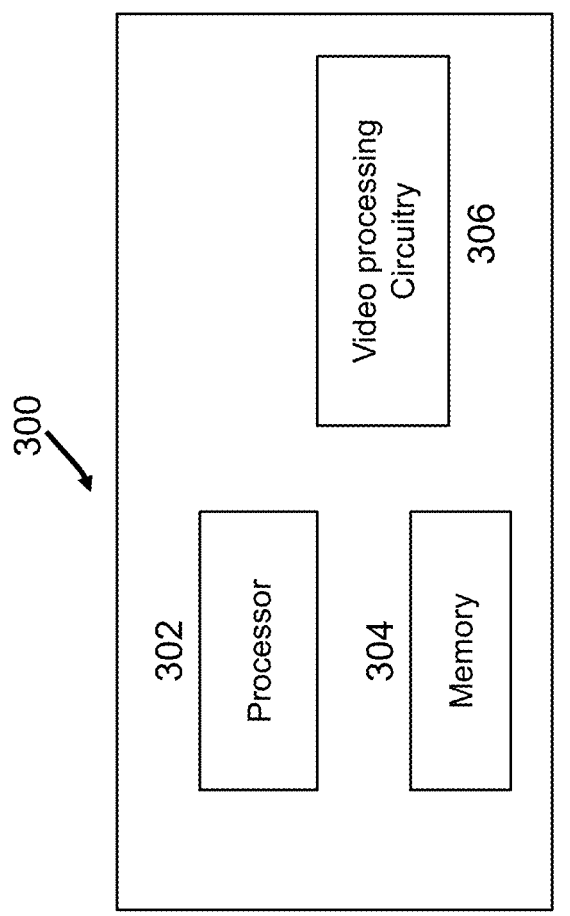
FIG. 3 is an example of a block diagram of a video decoding and/or encoding apparatus.

FIG. 3 shows a block diagram of an example embodiment of a hardware device 300 that can be utilized to implement various portions of the presently disclosed technology. The hardware device 300 can be a laptop, a smartphone, a tablet, a camcorder, or other types of devices that are capable of processing videos. The device 300 includes a processor or controller 302 to process data, and memory 304 in communication with the processor 2602 to store and/or buffer data. For example, the processor 302 can include a central processing unit (CPU) or a microcontroller unit (MCU). In some implementations, the processor 302 can include a field-programmable gate-array (FPGA). In some implementations, the device 300 includes or is in communication with a graphics processing unit (GPU), video processing unit (VPU) and/or wireless communications unit for various visual and/or communications data processing functions of the smartphone device. For example, the memory 304 can include and store processor-executable code, which when executed by the processor 302, configures the device 300 to perform various operations, e.g., such as receiving information, commands, and/or data, processing information and data, and transmitting or providing processed information/data to another device, such as an actuator or external display. To support various functions of the device 300, the memory 304 can store information and data, such as instructions, software, values, images, and other data processed or referenced by the processor 302. For example, various types of Random Access Memory (RAM) devices, Read Only Memory (ROM) devices, Flash Memory devices, and other suitable storage media can be used to implement storage functions of the memory 304. The device 300 may further include dedicated video processing circuitry 306 for performing repetitive computational functions such as transforms and decoding.

The techniques described in the present document may be implemented by the video encoder, or a video decoder, using a hardware platform such as described with respect to FIG. 3.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
performing a conversion between a video block and a bitstream of the video block based on at least one of a width and a height of the video block;
refraining from applying, in response to a ratio of the width to the height (W/H) being smaller than a first threshold value, a decoder side motion vector refinement step during the conversion; and
refraining from applying, in response to the ratio of the width to the height (W/H) being greater than a second threshold value, the decoder side motion vector refinement step during the conversion,
wherein W and H are the width and the height of the video block, respectively, and
wherein the decoder side motion vector refinement step includes refining a value of a motion vector signaled in the bitstream and using the refined value during the conversion,
wherein the decoder side motion vector refinement step is determined to be disabled when $W<=T1$ or $H<=T2$, wherein T1 is a third threshold and equal to 4 and T2 is a fourth threshold and equal to 4.

2. The method of claim 1, wherein the conversion includes decoding the bitstream into pixel values of the video block.

3. The method of claim 1, wherein the conversion includes encoding pixel values of the video block into the bitstream.

4. The method of claim 1, wherein the decoder side motion vector refinement step is determined to be disabled when $W<=T1$ and $H<=T2$.

5. The method of claim 1, wherein the decoder side motion vector refinement step is determined to be disabled when $W*H<=T0$, wherein T0 is a fifth threshold and T0 is an integer value greater than or equal to 1.

6. The method of claim 1, wherein the decoder side motion vector refinement step is determined to be disabled when $W=4$ and $H=4$.

7. The method of claim 1, wherein the decoder side motion vector refinement step is determined to be disabled when $W=4$ or $H=4$.

8. The method of claim 1, wherein the first threshold value and the second threshold value have fixed values.

9. The method of claim 1, wherein the second threshold value is equal to 8.

10. The method of claim 1, wherein in response to an affine mode being applied to the current block, the decoder side motion vector refinement step is refrained from the current block.

11. An apparatus for coding video data comprising a processor and a non-transitory memory with instructions thereon, wherein the instructions upon execution by the processor, cause the processor to:
- perform a conversion between a video block and a bitstream of the video block based on at least one of a width and a height of the video block;
- refrain from applying, in response to a ratio of the width to the height (W/H) being smaller than a first threshold value, a decoder side motion vector refinement step during the conversion; and
- refrain from applying, in response to the ratio of the width to the height (W/H) being greater than a second threshold value, the decoder side motion vector refinement step during the conversion,
- wherein W and H are the width and the height of the video block, respectively, and
- wherein the decoder side motion vector refinement step includes refining a value of a motion vector signaled in the bitstream and using the refined value during the conversion,
- wherein the decoder side motion vector refinement step is determined to be disabled when W<=T1 or H<=T2, wherein T1 is a third threshold and equal to 4 and T2 is a fourth threshold and equal to 4.

12. The apparatus of claim 11, wherein the conversion includes decoding the bitstream into pixel values of the video block.

13. The apparatus of claim 11, wherein the conversion includes encoding pixel values of the video block into the bitstream.

14. The apparatus of claim 11, wherein the decoder side motion vector refinement step is determined to be disabled when W<=T1 and H<=T2.

15. The apparatus of claim 11, wherein the decoder side motion vector refinement step is determined to be disabled when W*H<=T0, wherein T0 is a fifth threshold and T0 is an integer value greater than or equal to 1.

16. The apparatus of claim 11, wherein the decoder side motion vector refinement step is determined to be disabled when W=4 and H=4.

17. The apparatus of claim 11, wherein the decoder side motion vector refinement step is determined to be disabled when W=4 or H=4.

18. A non-transitory computer-readable storage medium storing instructions that cause a processor to:
- perform a conversion between a video block and a bitstream of the video block based on at least one of a width and a height of the video block;
- refrain from applying, in response to a ratio of the width to the height (W/H) being smaller than a first threshold value, a decoder side motion vector refinement step during the conversion; and
- refrain from applying, in response to the ratio of the width to the height (W/H) being greater than a second threshold value, the decoder side motion vector refinement step during the conversion,
- wherein W and H are the width and the height of the video block, respectively, and
- wherein the decoder side motion vector refinement step includes refining a value of a motion vector signaled in the bitstream and using the refined value during the conversion,
- wherein the decoder side motion vector refinement step is determined to be disabled when W<=T1 or H<=T2, wherein T1 is a third threshold and equal to 4 and T2 is a fourth threshold and equal to 4.

19. The non-transitory computer-readable storage medium of claim 18, wherein the decoder side motion vector refinement step is determined to be disabled in at least one of the following conditions:
- when W<=T1 and H<=T2;
- when W*H<=T0, wherein T0 is a fifth threshold and T0 is an integer value greater than or equal to 1;
- when W=4 and H=4; or
- when W=4 or H=4.

20. A non-transitory computer-readable storage medium storing a bitstream of a video which is generated by a method performed by a video processing apparatus, wherein the method comprises:
- generating the bitstream based on at least one of a width and a height of the video block;
- refrain from applying, in response to a ratio of the width to the height (W/H) being smaller than a first threshold value, a decoder side motion vector refinement step during the conversion; and
- refrain from applying, in response to the ratio of the width to the height (W/H) being greater than a second threshold value, the decoder side motion vector refinement step during the conversion,
- wherein W and H are the width and the height of the video block, respectively, and
- wherein the decoder side motion vector refinement step includes refining a value of a motion vector signaled in the bitstream and using the refined value during the conversion,
- wherein the decoder side motion vector refinement step is determined to be disabled when W<=T1 or H<=T2, wherein T1 is a third threshold and equal to 4 and T2 is a fourth threshold and equal to 4.

* * * * *